Nov. 22, 1932.    L. KRAL    1,888,388
REFLECTOR
Filed July 22, 1930
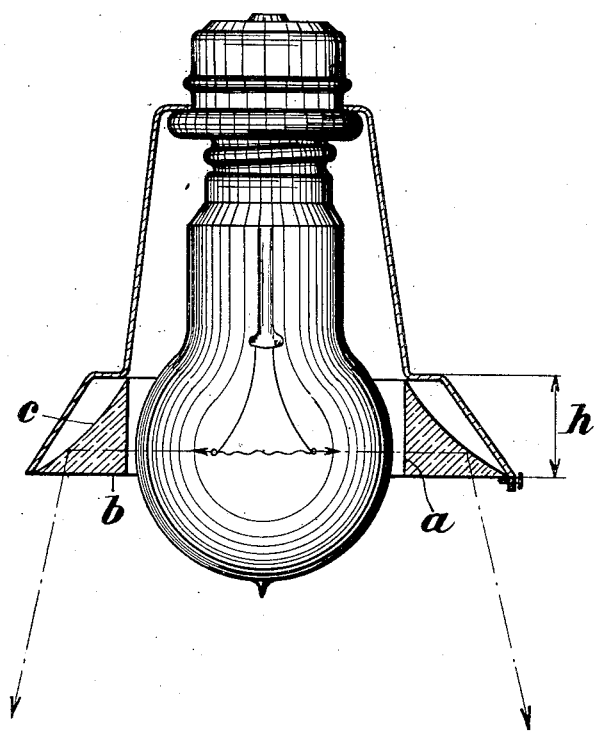

Patented Nov. 22, 1932

1,888,388

UNITED STATES PATENT OFFICE

LUDWIG KRAL, OF VIENNA, AUSTRIA, ASSIGNOR TO GRAL PRISMA GESELLSCHAFT M. B. H., OF VIENNA, AUSTRIA, A COMPANY OF AUSTRIA

REFLECTOR

Application filed July 22, 1930, Serial No. 469,800, and in Austria November 18, 1929.

This invention relates to improvements in lamp reflectors of the kind in which an annular member of glass or another light permeable material encloses a source of light, the light absorbing face and the light emitting face of said member being arranged at a right angle to each other.

According to the present invention, the third or light reflecting face of the reflector is shaped convex with respect to the source of light, in order to provide for a particularly favourable distribution of light.

A reflector with an electric incandescent lamp is shown in sectional elevation in the accompanying drawing.

As shown in the drawing, the reflector made of suitable glass consists of an annular member of triangular or like three-cornered cross-section, light absorbing face $a$ being either of cylindrical shape or slightly cone-shaped, while the light emitting face $b$ lies in a plane which is disposed substantially at a right angle with respect to the axis of the reflector. The third or light reflecting face $c$ of the annular member is covered with any convenient reflecting material and is of convex shape. In view of this construction, the annular reflecting member acts during reflection like a prism and thus reflects a great part of the rays of light when a source of light is arranged in the axis of the hole of the member and if the size of the source of light, for instance the filament of an electric incandescent lamp does not pass beyond the depth $h$ of the annular member.

Having thus fully described the invention what is claimed as new and desired to be secured by Letters Patent is:—

In a lamp reflector having an annular member of light permeable material enclosing a source of light with the light absorbing face and the light emitting face of said member arranged at a right angle to each other, the provision of a third or light reflecting face shaped convex with respect to the source of light.

In testimony whereof I affix my signature.

LUDWIG KRAL.